United States Patent [19]

Fuchs et al.

[11] Patent Number: 4,844,816

[45] Date of Patent: Jul. 4, 1989

[54] METHOD OF AERATION AT SPECIFIC DEPTH AND PRESSURE CONDITIONS

[76] Inventors: Leonhard Fuchs; Martin Fuchs, both of Im Stocktal 2, D-5440 Mayen 1, Fed. Rep. of Germany

[21] Appl. No.: 106,923

[22] Filed: Oct. 8, 1987

Related U.S. Application Data

[63] Continuation of Ser. No. 923,858, Oct. 28, 1986, abandoned.

[30] Foreign Application Priority Data

Oct. 31, 1985 [DE] Fed. Rep. of Germany ....... 3538715

[51] Int. Cl.⁴ ............................ C02F 1/74; C02F 7/00
[52] U.S. Cl. ....................................... 210/758; 261/87
[58] Field of Search ............ 210/758, 219, 220, 221.1; 261/87, 93, DIG. 70, DIG. 71

[56] References Cited

U.S. PATENT DOCUMENTS

| | | | |
|---|---|---|---|
| 3,778,233 | 12/1973 | Blough et al. | 210/170 |
| 3,782,702 | 1/1974 | King | 261/87 |
| 3,975,469 | 8/1976 | Fuchs | 261/87 |
| 4,280,911 | 7/1981 | Durda et al. | 210/758 |
| 4,308,221 | 12/1981 | Durda | 261/87 |
| 4,540,290 | 9/1985 | Järvinen et al. | 261/87 |

FOREIGN PATENT DOCUMENTS 3208025 9/1983 Fed. Rep. of Germany .

OTHER PUBLICATIONS

German Utility Model 7,411,389 Abstract, *Foreign Patent Journal*, German, Heft 18-35, May-Aug. 1974 issue, p. 1182.
Chemical Engineers' Handbook 5th ed., Perry & Chilton (ed.), McGraw-Hill Book Co., 1973, pp. 6-21-6-25.

*Primary Examiner*—Richard V. Fisher
*Assistant Examiner*—Linda S. Evans
*Attorney, Agent, or Firm*—Diller, Ramik & Wight

[57] ABSTRACT

A spiral tube aerator for waste aeration which includes a shaft rotatably driven by a motor, the shaft carrying a mixing chamber, an air channel extending along the shaft and opening through at least one outlet of the mixing member, a blower for delivering air through the air channel, the mixing chamber being submerged in waste water at least to a depth of 50 cm below the waste water upper surface, and the blower providing a pressure in the range 0–35 mbar lower than the pressure exerted by the waste water at the outlet.

1 Claim, 4 Drawing Sheets

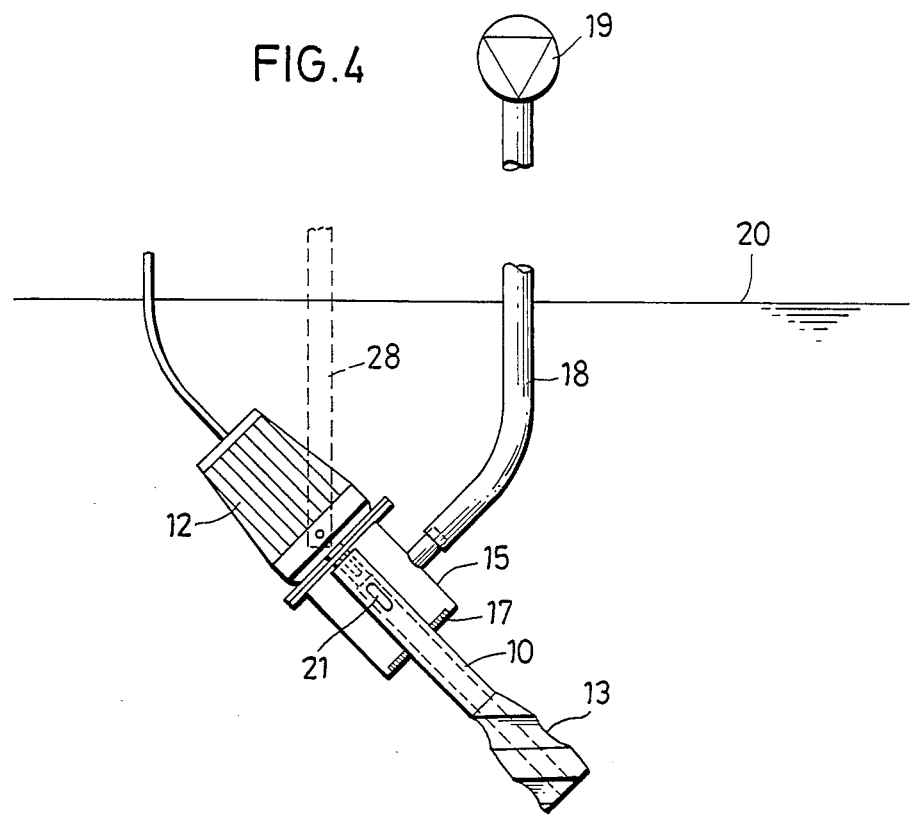

METHOD OF AERATION AT SPECIFIC DEPTH AND PRESSURE CONDITIONS

This application is a continuation of application Ser. No. 06/923.858, filed Oct. pb 28, 1986, now abandoned.

BACKGROUND OF THE INVENTION

This invention relates to a spiral tube aerator for waste water aeration, and includes a shaft rotatably driven at one end by a motor and carrying a mixing member at an end opposite thereof, a blower supplies air to outlets of the mixing member through an axial air bore or channel of the shaft, and with the mixing member immersed in waste water, air or oxygen is conveyed into the waste water which bubbles upwardly to provide aeration thereof.

It is conventional to use spiral tube aerators to convey air or oxygen into waste water. Normally, the conventional rotating shaft of a spiral tube aerator carries a mixing member designed as a multi-winged propeller or a helical propeller. The mixing member causes high acceleration of the water directly obliquely downward therefrom which creates suction to draw air through the bore of the shaft. Thus, as the mixing member is rotated by rotating the shaft, the air is distributed in fine bubbles and a portion of the oxygen thereof is dissolved in the waste water for aeration purposes. In order to obtain efficient aeration and a relatively large length of ascent of the small air bubbles of the mixing members to the surface of the waste water, the mixing member is normally arranged as far below the water surface as is possible. However, when introducing air into the bore of the shaft, it is difficult to overcome the high water pressure at the depth of the mixing member immersion. Thus, it is necessary in such conventional waste water aerators to provide a motor which consumes high electrical power/energy which in turn is simply not cost effective. Generally the air so introduced into the bore of the spiral tube aerator shaft is approximately 35 $m^3/kWh$.

There are, of course, spiral tube aerators in which low-pressure compressors supply pressurized air to the air bore or channel of the shaft leading to the mixing member (German laid open Patent Application 32 08 025). In this case the over-pressure in relation to atmosphere amounts to ca. 11.2 mbar. The overpressure is intended to provide extreme depth of operation of the spiral tube aerator and, of course, particularly a depth as great as possible for the immersion of the mixing member thereof. Air is introduced at low energy levels under a slight over-pressure so as to enable the mixing member to be submerged somewhat deeper into the waste water than the first type of aerators described herein.

It is also known to provide a mixing member for fluids in which the wings thereof are provided on the shaft carrying the mixing member within an enveloping jacket (German Utility Model 74 11 389). As the shaft rotates, the wings thereof form an axial blower and, therefore, only low air-pressure is necessary to serve as prepressure to create suction during the rotation of the mixing member. Furthermore, the number of revolutions of the shaft which are turned to the density of the water are far too low to build up significant air pressure along the wings.

SUMMARY OF THE INVENTION

In keeping with the foregoing, the present invention provides a spiral tube aerator of the first-mentioned type which can be submerged a considerable distance below the water level, can introduce a large amount of oxygen into the water, and can do so at a relatively low rate of energy consumption.

In further accordance with this invention, the submerged depth of the mixing member is approximately 50 cm, and the pressure produced by the associated blower is approximately 0 to 35 mbar below the water pressure exerted on the outlet(s) of the air bore or channel of the shaft.

In the spiral tube aerators according to the present invention the pressure generated by the blower is by about 0 to 35 mbar lower than the water pressure at the exhaust end of the air channel. Although the mixing member is positioned at a comparatively great depth in the water, even at such relatively large depths the water intrudes into the outlet(s) of the air bore or channel up to a height of only 0 to 35 cm when the shaft is at a standstill. When the shaft rotates, the mixing chamber rotating therewith creates suction resulting in the air being drawn from atmosphere down through the air bore and subsequently being introduced into the water through the outlets of the mixing member as fine bubbles. Depending upon the submerged depth of the mixing member, the pressure produced by the associated blower is designed in such a manner that the mixing member has to generate only a relatively low suction force to draw the air through the air bore or channel. Preferably, a water column measuring 10 to 35 cm in height is to be overcome for this purpose. If the mixing member is submerged to a greater depth, the spiral tube aerator is supplied with pressurized air and operates under the same conditions as known spiral tube aerators without pressurized air supplies in which the mixing chamber is arranged at or closely under the water surface. However, by submerging the mixing member at greater depths, the deeper depth of submersion, obviously, improves aeration. Studies have shown that 7 to 8 percent oxygen is disolved in the water if little air bubbles are finally distributed from relatively great depths. The height of ascent of the bubbles can increase by greater submersion depths of the mixing member without the motor capacity for rotating the shaft being noticably increased. In accordance with the given submerged depth of the mixing member, the blower generates approximately 10 to 20 percent of the total capacity. The gas conveying efficiency of the blower is, therefore, considerably higher than that of the rotating mixing member so that the total effectiveness of the spiral tube aerator is appreciably increased. With respect to the submerged depth of the mixing member, the suction power of the mixing member and the prepressure of the blower are tuned in such a way that, in relation to the electrical power consumption of the motor, there is provided an air throughput of the air bore or channel of the shaft more than 40 $m^3/kWh$ but preferably from 45 to 70 $m^3/kWh$.

In further accordance with the present invention, the submerged depth of the mixing member is preferably between approximately 50 and 120 cm, although the narrow range of 70–100 cm is preferred. When compared to a spiral tube aerator having its mixing chamber arranged immediately adjacent the upper surface of the water, the deep effect of the present spiral tube aerator is enlarged by the value of that additional submerged depth absent the necessity of increasing motor size/capacity/power.

In order to generate the desired prepressurized air, high pressure blowers with a speed of more than 3000 rpm or multistage radial compressors are employed. Axial blowers are not adapted to generate the required high pressures of about 30 to 100 mbar.

According to a preferred embodiment of this invention, the rotating shaft is surrounded by a jacket at a radial distance, and the jacket has a terminal end immediately adjacent the mixing member. The jacket is connected to a blower and the pressure generated by the blower within the jacket creates an annular air column between the jacket and the shaft which prevents water from rising therein. This creates a pneumatic annular air seal between the shaft and the jacket in the form of a standing annular air column. This reduces friction as might otherwise be created if the shaft were directly in contact with the water. Pressurized air is, of course, also supplied through the mixing member through the air bore heretofore mentioned and its outlets in the mixing member below the end of the jacket.

In further accordance with this invention the shaft of the spiral tube aerator is inclined at an angle of approximately 35 to 60 degrees to the water surface (horizontal), and preferably this angle is approximately between 40 to 50 degrees. This comparative steep angle of the shaft ensures that the jet of water and air bubbles can be created at great depths in the water/fluid being aerated. Furthermore, the shaft can be comparatively short if the motor is positioned above the water surface.

In accordance with this invention, the method of operating the spiral tube aerator for aerating of waste water includes the immersion of a shaft having an air channel extending therealong into waste water with an air outlet of the shaft at a point spaced at least 50 cm below the waste water surface at which the waste water is at a predetermined pressure adjacent the air outlet when the air inlet is under ambient pressure conditions. The pressurized air is then introduced into an air inlet of the air channel at a pressure range of 0-35 mbar lower than the predetermined waste water pressure at the air outlet which, in the absence of shaft rotation, lowers the ambient pressure waste water level within the air channel to a point adjacent but short of the air outlet. Thereafter the shaft is rotated sufficiently to create a suction at the air outlet and augment the introduced pressurized air causing the pressurized air to exit the air outlet effecting optimum aeration during shaft rotation while preventing pressurized air from exiting the air outlet upon cessation of shaft rotation.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 4 is a schematic side elevational view of another embodiment of the invention, and illustrates a submersible motor for rotating the shaft and mixing member.

DESCRIPTION OF THE PREFERRED EMBODIMENTS

Figure 1:
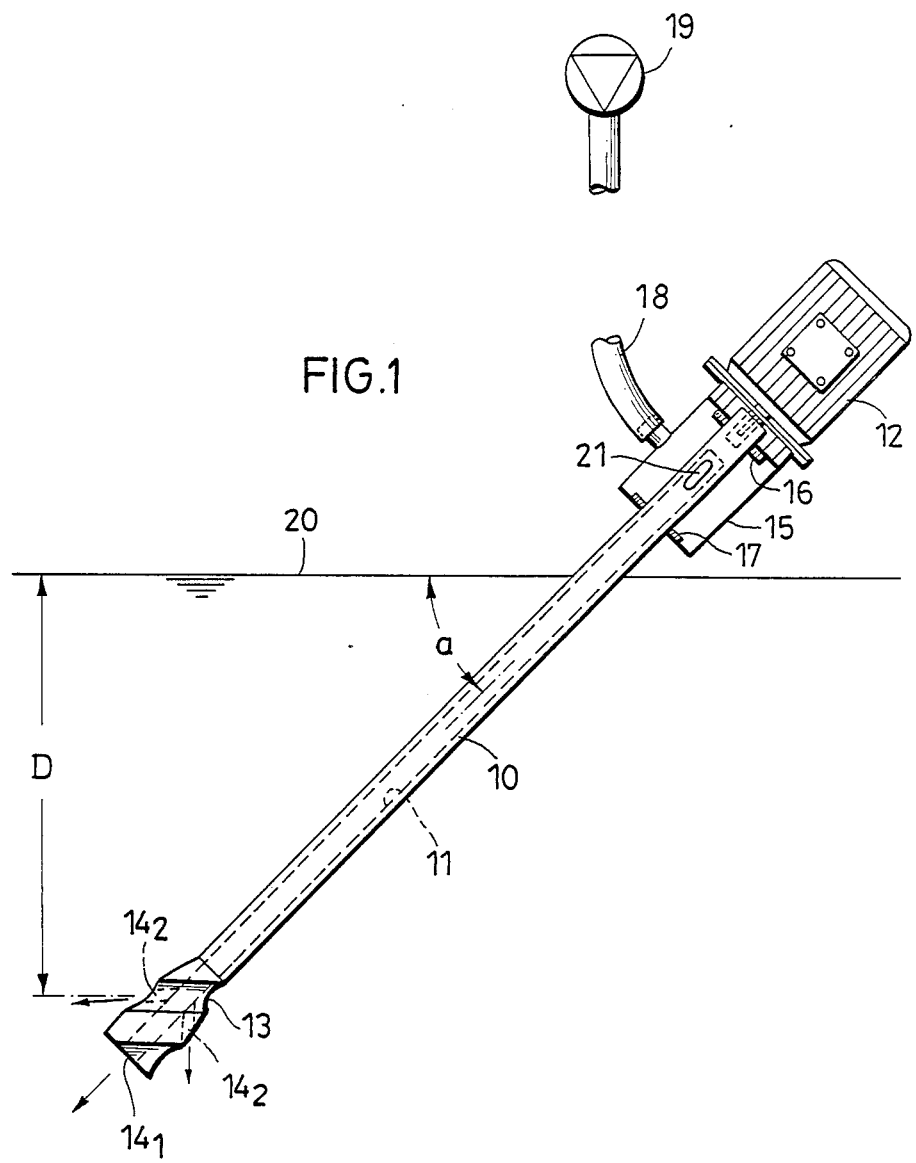
FIG. 1 is a fragmentary side elevational view in schematic form of a first spiral tube aerator of this invention, and illustrates a hollow shaft having a mixing member at one end and a blower and motor at an opposite end for respectively pressurizing air delivered to the mixing member and rotating the shaft.

A novel spiral tube aerator constructed in accordance with this invention is illustrated in FIG. 1 of the drawings and includes a hollow shaft 10 having an axial air bore or channel 11. The shaft 10 includes upper and lower ends (unnumbered), the upper end of which is connected to and driven by an electric motor 12 energized from a suitable conventional power source (not shown). A mixing member 13 is carried by an opposite end of the hollow shaft 10. The mixing member 13 includes a multiwinged propeller in the form of a helix or a helical groove. When the hollow shaft 10 is rotated by the electric motor 12, the mixing member 13 also rotates and, thus, generates a fluid/water current which is directed obliquely downwardly. The mixing member 13 includes a plurality of air exhaust ports or air outlets $14_1$ and $14_2$ which, of course, are in fluid communication with the axial air bore or channel 11.

A hollow pressure housing 15 is connected to the motor 12 and extends partially along the the upper end of the hollow shaft 10 above a surface 20 of the water which is to be aerated. The hollow shaft 10 is positioned at an oblique angle a to the water surface. The pressure housing 15 includes two seals 16, 17 which seal the shaft 10 relative to the housing 15 and the motor 12. An air duct 18 communicates from a blower 19 such as a high-speed one-stage pressure blower or a multi-staged radial blower, into the pressure housing 15 and due to the seals 16, 17 the air in the housing will flow only through an opening 21 in the hollow shaft 10 into the air bore or channel 11 and eventually outward of the outlets $14_1$ and $14_2$, as indicated by the unnumbered headed arrows associated therewith in FIG. 1.

The pressure delivered by the blower 19 to the pressure housing 15 and within the air bore or channel 11 is within the range of approximately 20 to 30 mbar below the water pressure at the depth D of the mixing member 13 below the upper surface 20. When the shaft 10 is at a standstill, the pressurized air within the pressure housing 15 and the air bore or channel 11 pushes the water downwardly out of the air bore or channel 11 through the outlets $14_1$ and $14_2$, except for a very small column of water at a height of approximately 20 to 30 cm at the lower end of the hollow shaft 10 in the air bore or channel 11. However, when the motor 12 is actuated and the mixing member 13 is rotated by the shaft 10, the latter small height water column is pulled out of the air bore 11 through the outlets $14_1$ and $14_2$ by the resulting suction created by rotation and, of course, air is subsequently sucked into the waste water through the outlets $14_1$ and $14_2$. The latter air eventually is discharged in rising bubbles to create aeration of the water.

Figure 2:
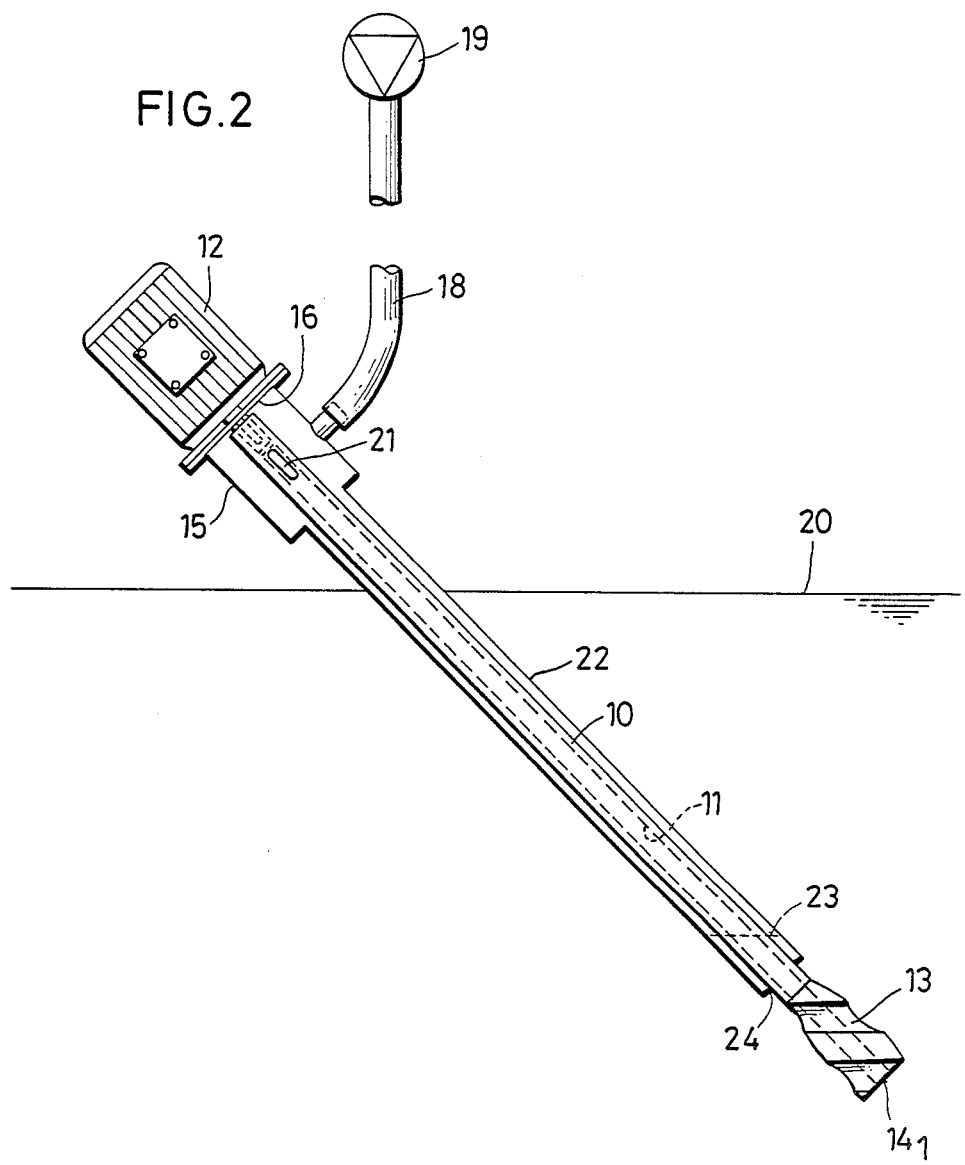
FIG. 2 is a schematic side elevational view, and illustrates another spiral tube aerator of this invention in which a shaft is essentially totally encased by a jacket.

Reference is now made to FIG. 2 of the drawings in which the pressure housing 15 includes an elongated reduced portion or jacket 22 in the form of a sleeve which forms a mechanical gasket along a major length of the hollow shaft 10. The jacket 22 is radially spaced from the exterior surface (unnumbered) of the shaft 10 and since the jacket 22 is in communication and forms a part of the pressure housing 15, air pressure generated by the blower 19 forces the water in the annular chamber between the shaft 10 and the jacket 22 to a considerable distance below the upper water surface 20, as indicated by the water level 23. The air pressure delivered by the blower 19 is only slightly less than the weight of the water column that exerts pressure unto the front end of the jacket and, therefore, most of the water is simply excluded from the annular space between the jacket 22 to the shaft 10 except for the minor amount between a free terminal end 24 of the jacket 22 and the water level 23 heretofore noted. Accordingly the latter very short water column forms a mechanical seal preventing the air from exiting generally at the end of the jacket 25. Hence, substantially the entire exterior of the shaft 10 rotates only against the relatively minor/nonexistent air friction within the jacket 22 which increases the efficiency of aeration and lowers the electrical power consumed by the motor 12, as would otherwise occur if, for example, the shaft 10 had to rotate against a higher friction of water along the entire length of the shaft 10, as in the case of the invention of FIG. 1. Thus, by virtue of the mechanical/water seal between the water level 23 and the end 24 of the jacket 22, efficiency of operation is increased and gaskets of the type illustrated at 16, 17 in FIG. 1 are unnecessary in the spiral aerator of FIG. 2. Furthermore, even though the shaft 10 is considerably long, bearings are not required at the end 24 since the water column functions as a bearing or support for centering the end of the shaft adjacent the mixing member 13 relative to the jacket 22. Hence, even though there is no positive structural bearings between the jacket 22 and the shaft 10, the short water column between the water surface or level 23 and the end 24 of the jacket 22 is effectively a bearing for precisely centering the shaft 10 and maintaining wobble-free rotation when driven by the motor 12. Obviously, the same air pressure introduced into the pressure housing 15 flows through the opening 21 along the air channel or bore 11 and exits the axial outlet $14_1$ of the mixing member 13 to create air bubbles/aeration. Other outlets, such as the outlets $14_2$ of FIG. 1 may be utilized in conjunction with the mixing member 13 of FIG. 2. However, absent the outlets $14_2$, rotation of the motor 12 simply necessitates overcoming the counterpressure corresponding to the height of the water between the outlet $14_1$ and the water level 23. Furthermore, by rotation of the mixing member 13 air is sucked-out of the jacket 22 and could totally draw the water column therefrom. In this case it is advantageous to construct the lower end 24 in such a manner that the end 24 forms a comparatively tight enclosure around the shaft 10 to both center the shaft 10 during rotation and create a throttling effect for air exiting the jacket 22. The latter assures that the major portion of air introduced into the pressure housing 15 from the blower 19 is exhausted through the outlet $14_1$ and not through the annular space (unnumbered) between the end 24 of the jacket 22 and the adjacent exterior surface (unnumbered) of the shaft 10.

Figure 3:
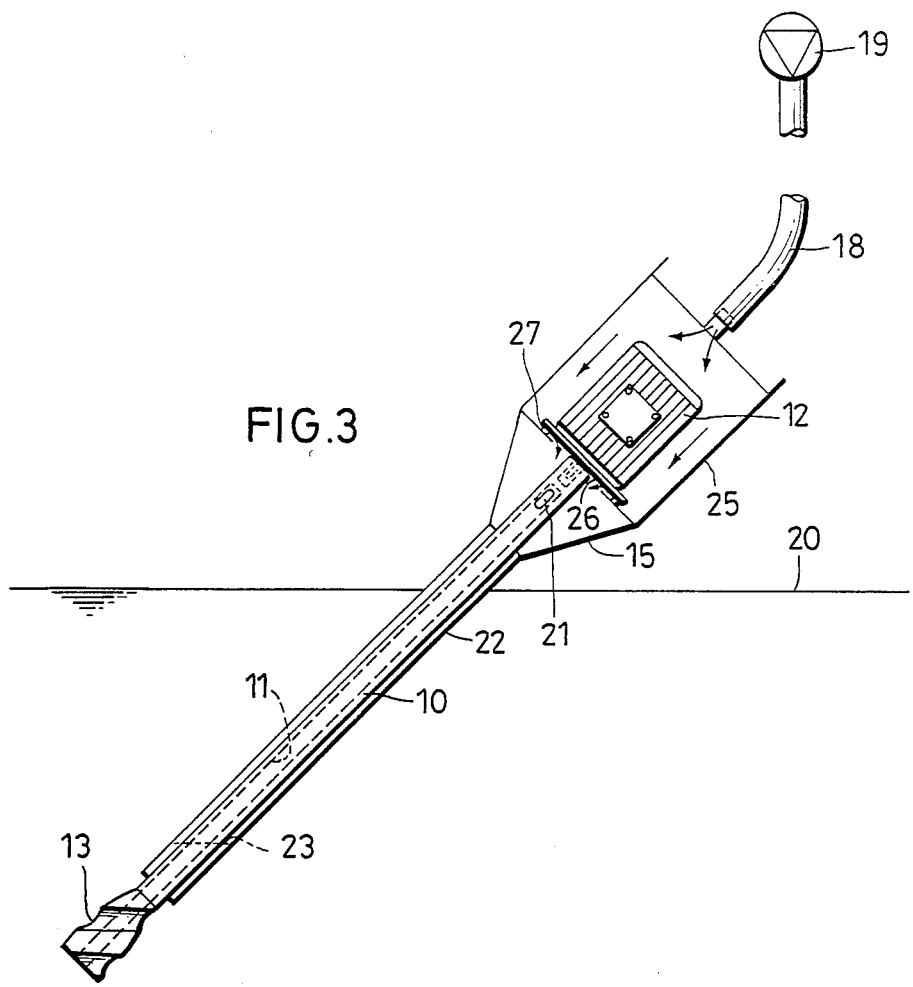
FIG. 3 is a schematic side elevational view of another spiral tube aerator, and illustrates a jacket surrounding the rotating shaft and having an extension for also housing a motor.

Reference is now made to FIG. 3 of the drawings in which another spiral tube aerator is illustrted and like elements thereof are numbered identically to the spiral tube aerator of FIGS. 1 and 2. The spiral tube aerator of FIG. 3 is virtually identical to the spiral tube aerator of FIG. 2 except for the fact that the duct 18 of FIG. 3 does not lead directly into a pressure housing 15 immediately surrounding the upper end (unnumbered) of the shaft 10, but instead is connected to an airtight casing 25 completely enclosing or housing the motor 12. The housing 25 is attached to the housing 15 and to the motor 12 in a conventional manner through associated mounting means and supporting members 27. The pressurized air blown by the blower 19 streams into the housing 25 and then into the pressure housing 15 through openings 26 in or along the supporting member 27. The pressurized air streams flowing along the motor 12, as indicated by the unnumbered headed arrows in FIG. 3 closely adjacent thereto, function to cool the motor 12 in addition to supplying air into the axial bore 11 through the aperture 21 and between the exterior of the shaft 10 and the slightly radially spaced interior surface (unnumbered) of the jacket 22.

Another spiral tube aerator is shown in FIG. 4, but in this case the motor 12 is not arranged above the water surface 20 but is instead a submersible motor submerged below the upper water surface 20. The submersible motor is held suspended in the position illustrated by conventional support means 28. This arrangement allows the use of a relatively short shaft 10, and otherwise the arrangement approximates that of the spiral tube aerator of FIG. 1 except the gasket 16 is not required and omitted are the outlets $14_2$.

Although a preferred embodiment of the invention has been specifically illustrated and described herein, it is to be understood that minor variations may be made in the apparatus without departing from the spirit and scope of the invention, as defined in the appended claims.

What is claimed is:

1. A method of operating a spiral tube aerator for waste water aeration comprising the steps of: providing a shaft having an air channel extending therealong through which air is adapted to flow between an air inlet and an air outlet at generally opposite end portions of the shaft, immersing the shaft in waste water with the air outlet at a point spaced at least 50 cm below an upper surface of the waste water at which the waste water is at a predetermined pressure adjacent the air outlet when the air inlet is under ambient pressure conditions and under such ambient pressure conditions the waste water rises in the air channel to the level of the waste water outside said air channel, introducing pressurized air into the air inlet at a pressure range of 0-35 mbar lower than the predetermined waste water pressure at the air outlet which in the absence of shaft rotation lowers the ambient pressure waste water level within the air channel to a point adjacent but short of the air outlet, and rotating the shaft sufficiently to create a suction at the air outlet and augment the introduced pressurized air causing the pressurized air to exit the air outlet effecting optimum aeration during shaft rotation while preventing pressurized air from exiting the air outlet upon cessation of shaft rotation.

* * * * *